United States Patent
Brown et al.

(10) Patent No.: US 8,050,849 B1
(45) Date of Patent: Nov. 1, 2011

(54) MIXED-MODE FUEL MINIMIZATION

(75) Inventors: Gerald Gerard Brown, Pebble Beach, CA (US); Jeffrey Eugene Kline, Salinas, CA (US); Richard Edwin Rosenthal, Monterey, CA (US); Pascale Menconi, legal representative, Monterey, CA (US); Alan R. Washburn, Monterey, CA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 506 days.

(21) Appl. No.: 12/368,823

(22) Filed: Feb. 10, 2009

Related U.S. Application Data

(60) Provisional application No. 61/070,618, filed on Mar. 20, 2008.

(51) Int. Cl.
*B63H 21/00* (2006.01)
*B63H 3/00* (2006.01)
*G06F 17/00* (2006.01)

(52) U.S. Cl. ............... 701/104; 701/21; 701/123; 440/1; 440/86

(58) Field of Classification Search ............... 701/104, 701/21, 29, 64, 123; 440/1, 86, 84, 181
See application file for complete search history.

(56) References Cited

U.S. PATENT DOCUMENTS

| | | | | |
|---|---|---|---|---|
| 5,413,461 | A * | 5/1995 | Johnsen | 416/1 |
| 6,458,003 | B1 * | 10/2002 | Krueger | 440/1 |
| 7,311,058 | B1 * | 12/2007 | Brooks et al. | 114/285 |
| 7,931,511 | B2 * | 4/2011 | Suzuki et al. | 440/1 |
| 2009/0048726 | A1 * | 2/2009 | Lofall | 701/21 |

OTHER PUBLICATIONS

Brown, Gerald G., Kline, Jeffrey E., Rosenthal, Richard E., and Washburn, Alan R., Steaming on Convex Hulls. Interfaces [online], Jul.-Aug. 2007, vol. 37, No. 4, pp. 342-352 [retrieved on May 12, 2010]. Retrieved from the Internet: <URL: http://interfaces.journal.informs.org/cgi/reprint/37/4/342>.

* cited by examiner

*Primary Examiner* — Tan Q Nguyen
(74) *Attorney, Agent, or Firm* — Donald E. Lincoln; Lisa A. Norris

(57) ABSTRACT

A mixed-mode method for operating a vehicle's propulsion plant to travel at a selected average speed using the minimum amount of fuel. The method involves travelling in one mode at high speed part of the time, and in a different mode at low speed part of the time, in such a way that the average speed is the selected value.

3 Claims, 2 Drawing Sheets

Determining Operating Point Q as a Mixture of R and P

The Lower Convex Hull (LCH) of Four Modal Propulsion Curves

Determining Operating Point Q as a Mixture of R and P

MIXED-MODE FUEL MINIMIZATION

CROSS-REFERENCE TO RELATED APPLICATIONS

This application claims the benefit of U.S. Provisional Application No. 61/070,618, filed Mar. 20, 2008, which is hereby incorporated in its entirety by reference.

BACKGROUND OF THE INVENTION

1. Field of the Invention

The invention relates generally to minimization of fuel consumption in multi-mode vehicles.

2. Description of the Related Art

Modern vehicles that move on land, on sea, or in the air frequently have power plants with multiple modes. A truck can be in various gears, each of which is a mode. A multi-engine aircraft will sometimes deliberately operate with some of its engines shut down. Each set of operating engines is a mode. Ships sometimes have multiple shafts, or multiple engines of different types, and a decision must be made regarding the best mode to use. Fuel consumption varies continuously with speed in each mode, and each mode has limits on the speeds that can be safely obtained.

The problem of mode selection is particularly acute for navy ships, because they must be capable of high speeds. The high-speed mode may be very different and less efficient than other modes, but must still sometimes be employed for tactical reasons.

Naval surface-combatant ships consume large quantities of fuel. For example, in Full Power mode four LM2500 gas-turbine engines power a DDG51 Arleigh Burke-class, guided-missile destroyer. Other modes where some of these engines are shut down, or where one of the DDG51's two shafts is not powered at all, are also possible. Depending on propulsion mode and speed, these four turbines can collectively consume from 600 to 7,000 gallons per hour (GPH) of distillate marine fuel. That means that the destroyer's fuel consumption while at sea is between one hundred thousand and one million gallons per week. For surface combatants alone, marine fuel costs the U.S. Navy about a billion dollars per year. Even a small percentage change in such quantities can have significant fiscal consequences.

The U.S. Navy is keenly aware of its fuel consumption, seeks innovations to conserve fuel, and prescribes how its ships should monitor, control, and minimize fuel use. For each ship class, sea trials are conducted to determine fuel-consumption as a function of speed for every propulsion-plant mode, and then published as standards in tabulations that can be used to plan transits and ship plant operating modes. Mixed-mode operations, however, are not included in those tabulations.

SUMMARY OF THE INVENTION

Embodiments in accordance with the invention provide a method for minimizing the fuel consumption of a vehicle having a multimode propulsion plant. More particularly, embodiments in accordance with the invention provide a method for selection of the most fuel-efficient mode, including the possibility that the most efficient mode may be mixed; that is, the vehicle should operate in one mode part of the time and in a different mode the rest of the time. Embodiments in accordance with the invention generalize the published tabulations and provide a method to find optimal, mixed-mode transits The vehicle is assumed to desire to travel a selected distance at a selected average speed V, and to have a propulsion plant that can be configured in multiple modes. Depending on the modes available, the best fuel economy can sometimes be achieved by mixing two modes, rather than traveling the entire distance in a single mode, sometimes moving faster than V, and sometimes slower. Embodiments in accordance with the invention provide a method for determining the best two modes to mix, and the proportion of time for which each should be used.

In accordance with one embodiment, a method includes: collecting fuel consumption data for each of the available propulsion modes; forming a fuel consumption curve for each propulsion mode; forming the convex hull of all of the modal fuel consumption curves; finding the point on the convex hull that corresponds to the selected average speed V; and, depending on the placement of that point, determining the best mixture of modes.

If the selected point on the convex hull that corresponds to the selected average speed V is also on one of the modal curves, then travel should be entirely in that mode. If the point is not on one of the modal fuel consumption curves, in one embodiment, the method further includes: determining where the convex hull connects a first point corresponding to a low speed U on a first modal fuel consumption curve with a second point corresponding to a high speed W on a second modal fuel consumption curve; and, operating the vehicle in the second mode at speed W for a fraction f of the selected transit time, where $$f = \frac{V - U}{W - U},$$

and otherwise operating the vehicle in the first mode at speed U.

DETAILED DESCRIPTION OF THE INVENTION

Embodiments in accordance with the invention provide a method for minimizing the amount of fuel required for a vehicle such as a ship to move between two specified locations in a specified time. Embodiments in accordance with the invention are described in terms of navy ships, which are expected to be the primary beneficiaries. The tactical situation is assumed to be that a certain transit between two points A and B is required to be made in a certain time T, or faster, a situation that occurs frequently for navy ships. Subject to that constraint, embodiments in accordance with the invention minimize the amount of fuel consumed in moving from A to B. Those of skill in the art can understand that the principles of the invention are also applicable to any multi-mode vehicle, and are not limited to navy ships.

Figure 1:
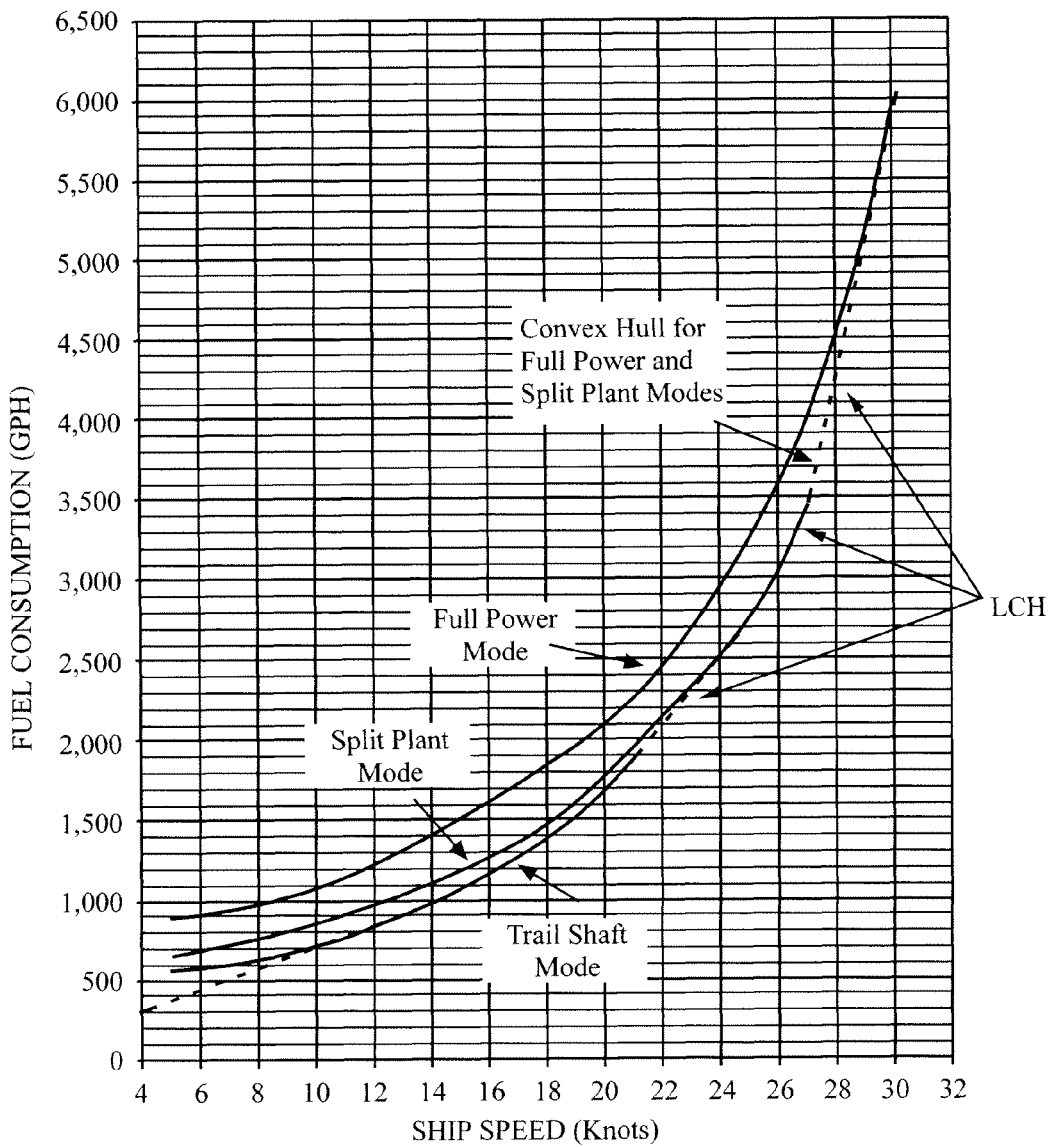
FIG. 1 graphically illustrates fuel consumption curves for a DDG51-class destroyer for three modes of the ship's power plant, as well as the lower convex hull (LCH) of those three modal curves plus the Cold Plant mode.
Figure 2:
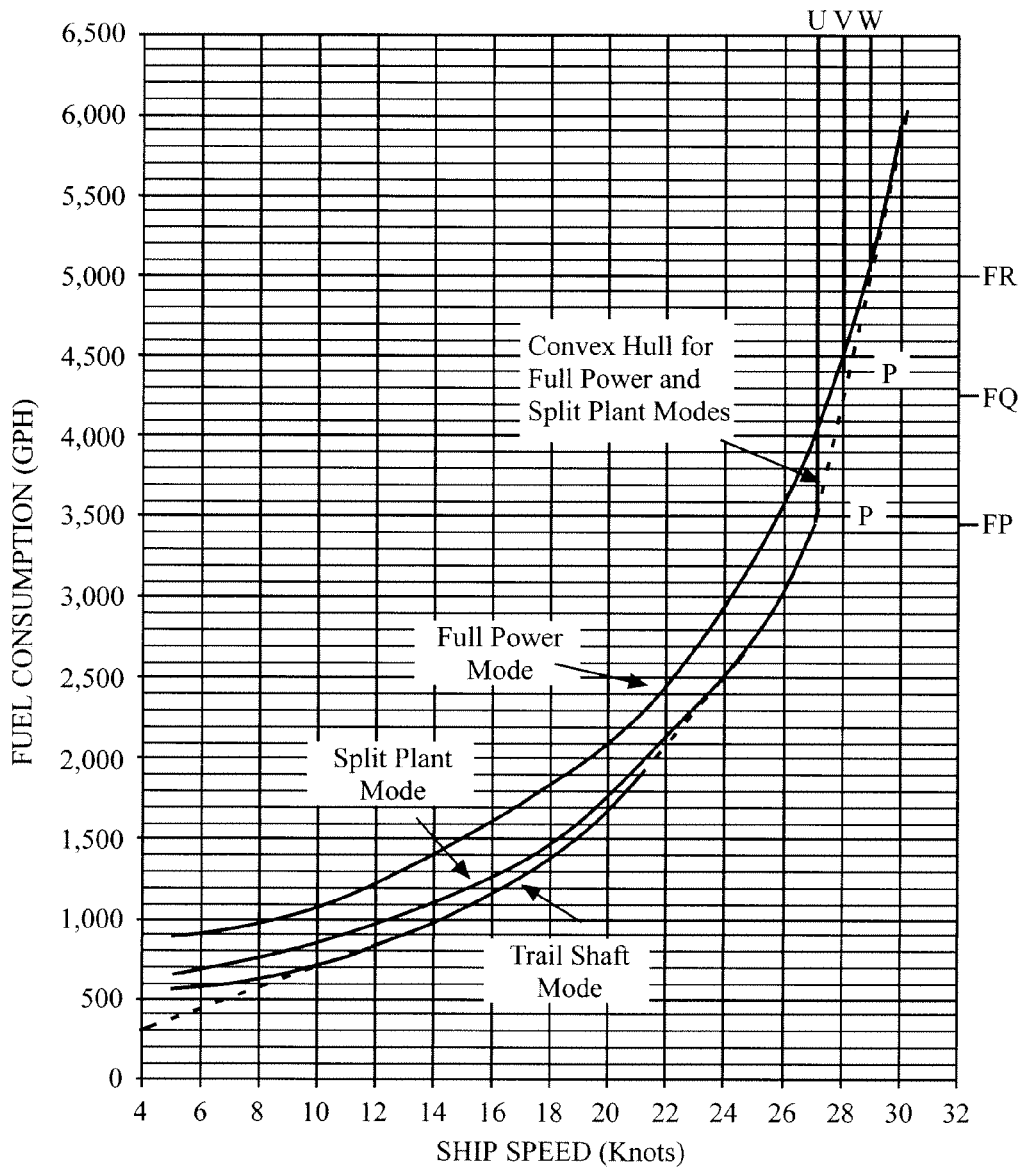
FIG. 2 shows additions to FIG. 1 that may be used to reduce fuel consumption at speed V by mixing speeds U and W in different modes in accordance with one embodiment of the invention.

In order to minimize fuel consumption, it is necessary to first measure fuel consumption as a function of speed for every operating mode. As mentioned above, the U.S. Navy already does this. Each mode thus has a continuous curve relating fuel consumption (vertical axis) to speed (horizontal axis) as shown in FIGS. 1 and 2. FIG. 1 shows four different modes for the DDG51-class destroyer. The DDG51 has two shafts with two LM2500 engines for each shaft. Other than Cold Plant mode in which the ship is anchored or tied up, there are three common plant-operation modes: (1) In Trail Shaft mode, only one of the four turbines is online. It drives one shaft, while the idled shaft is said to be "trailing." (2) In Split Plant mode, two engines are online, each driving one shaft. (3) Under Full Power mode, all four turbines are online, with two turbines driving each shaft. This collection of modal curves is the fundamental technological input. The Cold Plant mode corresponding to being at rest should always be included in the collection. The Cold Plant fuel consumption "curve" consists of a single point where the speed is zero.

Now imagine surrounding the collection of modal fuel consumption curves with a rubber band and then letting go of the rubber band. The final shape of the rubber band is the convex hull of the set of points constituting the curves. It is only the lower part of the convex hull that relates to this invention. This portion of the convex hull is referred to as the Lower Convex Hull, or LCH. Like the modal fuel consumption curves, the LCH can be determined in advance of operations and stored either electronically or graphically. In FIG. 1, the LCH is the lower boundary of four modal curves (including the Cold Plant curve), augmented by three dashed segments where the LCH is lower than any of the modal curves.

The requirement to go from point A to point B in time T or less is essentially a requirement to maintain a given average speed V over a time interval of length T. The best mixed mode is found by locating V on the horizontal axis and finding the point Q of the LCH directly above it (if there is none, then the selected speed is not feasible). There are two possibilities. One is that point Q is actually on one of the modal fuel consumption curves. In that case, mixed-mode operations are not useful. The transit should be made at constant speed V in the mode whose fuel consumption curve agrees with the LCH at speed V, and goes through point Q. If the vertical coordinate of Q is FQ, then the fuel consumption rate in going from A to B will be FQ, and the total fuel consumption in going from A to B will be the product T×FQ.

The second possibility is that Q is not on any modal curve. In that case Q must be on a linear segment of the LCH that connects two other points, P and R, which are each on modal curves (this is a consequence of Carathéodory's theorem). In spite of the fact that Q itself is not on any modal curve, its fuel consumption rate FQ is still feasible if the modes corresponding to P and R are correctly mixed. Specifically, let U and W be the speeds corresponding to P and R, and likewise let FP and FR be the fuel consumption rates at those speeds (see FIG. 2). Since V is larger than U and smaller than W, V must be some fraction f of the way from U to W; that is, V=(1−f)× U+f×W. Solving for the fraction f yields $$f = \frac{V - U}{W - U}.$$

The optimal mixed mode transit is to spend a time f×T in the R-mode at speed W, and the rest of the time (1−f)×T in the P-mode at speed U. The total fuel consumption will be f×T× FR+(1−f)×T×FP. Because Q is on the linear segment connecting P and R, this total fuel consumption is also T×FQ; that is, the average fuel consumption rate FQ can be achieved by spending part of the transit at speed U and part of the transit at speed W, as specified above. Thus, in accordance with one embodiment, FQ can be achieved in a carefully chosen mixed-mode, even though it cannot be achieved with any single mode.

FIG. 2 shows determination of the optimal mixed mode to achieve an average speed of V=28 knots for a DDG51-class destroyer. Point Q is on a dashed part of the LCH, so a mixture of the points P, with speed U=27 knots in Split Plant mode, and R, with speed W=29 knots in Full Power mode, should be used. To achieve 28 knots on average, f must be 0.5. The average fuel consumption rate is then 0.5×FP+0.5×FR=0.5× 3,450 GPH+0.5×5,100 GPH=4,275 GPH, which is also FQ. The same speed could be achieved using only Full Power mode, but the fuel consumption would then be 4,475 GPH. Using the mixed mode saves 200 GPH. An even greater savings of almost 500 GPH could be achieved if the required speed were just over 27 knots, the highest possible speed in Split Plant Mode. The mixed mode would spend nearly all of the time in Split Plant mode, consuming fuel at the rate of just over 3,500 GPH, but the only feasible single mode is Full Power Mode, which consumes fuel at the rate of 4,000 GPH.

The analysis according to one embodiment determines the optimal combination of modes, not the sequence in which they should be employed. When mixing two modes is necessary, the vehicle's operator has the flexibility to decide on the ordering of modes for reasons other than fuel economy. A prudent operator might go fast initially because this provides some insurance against unanticipated delays. There is always some cost in switching from one mode to another, of course, so the number of switches should be minimized.

The curve LCH has been shown to define the minimal fuel consumption rate as a function of speed. Parts of LCH require only a single operational mode to achieve minimal fuel consumption and other parts require two modes. It is not necessary to use more than two modes to achieve optimal fuel economy. In one embodiment, the implementation might be graphical, as in the description above. In another embodiment, the implementation can be an entirely mathematical method where the modal curves are measured and stored, the user provides the required average speed V, and the best mode of operations, possibly mixed, is computed. One embodiment of a mathematical method is described below. This embodiment has the advantage of being able to deal with a group of vehicles, all of which have different fuel consumption characteristics, and all of which are required to make the same transit. Such group transits are commonplace for the U.S. Navy.

Described below is one embodiment of a mathematical method in accordance with the invention based on linear programming. First the indexes and the given data are defined, then the required variables, then the objective to be minimized (total fuel consumption), and finally the constraints that make the solution meaningful:

| Index Use [cardinality] | |
| --- | --- |
| v ∈ V | vehicle [about 10] |
| s ∈ S | speed index [about 100] |

Given Data [Units]
distance is the required transit distance [miles]
speed$_{v,s}$ is the speed [miles/hour]
frate$_{v,s}$ is the fuel consumption rate for vehicle v operating in its most efficient mode at speed$_s$ [gallons/hour]

hours is the maximum allowed transit time [hours]

Decision Variables [Units]

$HOURS_{v,s}$ is the time vehicle v should spend underway at speed s [hours]

The following linear program MINFUEL will minimize total fuel consumption for a group of vehicles:

$$\underset{HOURS}{\text{minimize}} \sum_{v \in V} \sum_{s \in S} frate_{v,s} HOURS_{v,s} \quad (1)$$

$$\text{subject to} \sum_{s \in S} speed_{v,s} HOURS_{v,s} \leq \text{distance, for all } v \text{ in } V. \quad (2)$$

$$\sum_{s \in S} HOURS_{v,s} \leq hours, \text{ for all } v \text{ in } V \quad (3)$$

$$HOURS_s \geq 0, \text{ for all } v \text{ in } V \text{ and for all } s \text{ in } S \quad (4)$$

The objective function (1) accounts for total fuel consumption in transit. Constraint (2) requires that each vehicle travels the required distance, constraint (3) requires that each vehicle travels for at most the given number of hours, and constraint (4) enforces nonnegativity. MINFUEL is easily solvable even for large groups of vehicles. The vehicles will all arrive on time, but will not travel in a group if any fuel can be saved by separating. A different version of MINFUEL could force all vehicles to travel together, as is often required for transit of Navy battle groups. The constraints could also enforce preservation of minimal reserve fuel, and various other practical considerations.

Table 1 below shows some of the fuel savings that are possible by using mixed modes for the DDG51 and five other classes of U.S. Navy ships. Of course, there are also many other situations where no savings at all is possible because single-mode operations are optimal. As mentioned earlier, however, even small percentages of fuel savings are worth pursuing.

TABLE 1

Potential Fuel Saving for Six Navy Ships

| Ship Class | Average Speed | Single mode GPH | Mixed mode GPH | Savings (GPH) | Savings (%) |
|---|---|---|---|---|---|
| DDG51 | 27 | 4000 | 3500 | 500 | 12.5 |
| PC1 | 12 | 80 | 60 | 20 | 25 |
| LHD1 | 4 | 1100 | 500 | 600 | 54.5 |
| LSD41 | 18 | 850 | 837 | 13 | 1.5 |
| FFG7 | 26 | 2287 | 2233 | 54 | 2.4 |
| CG47 | 27 | 3500 | 3404 | 96 | 2.7 |

What is claimed is:

1. A method for improving the fuel economy of a vehicle having multiple propulsion modes where the vehicle travels a selected distance at a selected average speed V, comprising:
    (a) obtaining fuel consumption data as a function of ship speed for each mode of the vehicle's propulsion plant; and
    (b) determining optimum propulsion modes by identifying a low-speed propulsion mode and a high-speed propulsion mode that have an average speed that equals the selected average speed V and that have fuel consumption rates that minimize total fuel consumption when part of the selected distance is traveled in the first propulsion mode and the rest of the selected distance is traveled in the second propulsion mode.

2. The method of claim 1 wherein said optimum propulsion modes are determined by collecting fuel consumption data as a function of speed for each propulsion mode.

3. The method of claim 1 further comprising:
    (a) forming a modal fuel consumption curve of the fuel consumption data for each propulsion mode of the vehicle;
    (b) forming the convex hull of all of the modal fuel consumption curves of fuel consumption data for each propulsion mode;
    (d) finding the point on the convex hull that corresponds to the selected average speed V;
    (e) for operating conditions where the point on the convex hull that corresponds to the selected average speed V is not on one of the modal fuel consumption curves, determining where the convex hull connects a first point corresponding to a low speed U on a first modal fuel consumption curve with a second point corresponding to a high speed W on a second modal fuel consumption curve; and
    (f) operating the vehicle in the second mode at speed W for a fraction f of the selected transit time, where $$f = \frac{V - U}{W - U},$$

and otherwise operating the vehicle in the first mode at speed U.

* * * * *